(12) United States Patent
Abusleme et al.

(10) Patent No.: US 7,879,962 B2
(45) Date of Patent: Feb. 1, 2011

(54) POWDERS OR MANUFACTURED ARTICLES HAVING A SURFACE HYDROPHILICITY

(75) Inventors: Julio A. Abusleme, Varese (IT); Gabriella Carignano, Milan (IT)

(73) Assignee: Solvay Solexis S.p.A, Milan (IT)

( * ) Notice: Subject to any disclaimer, the term of this patent is extended or adjusted under 35 U.S.C. 154(b) by 993 days.

(21) Appl. No.: 11/384,823

(22) Filed: Mar. 21, 2006

(65) Prior Publication Data

US 2006/0229421 A1   Oct. 12, 2006

(30) Foreign Application Priority Data

Mar. 22, 2005   (IT) .......................... MI2005A0474

(51) Int. Cl.
*C08F 214/18*   (2006.01)
(52) U.S. Cl. .................. 526/249; 526/73; 526/250; 526/255; 526/303.1; 526/319
(58) Field of Classification Search ................ 526/249, 526/73, 250, 255, 303.1, 319
See application file for complete search history.

(56) References Cited

U.S. PATENT DOCUMENTS

| 4,623,670 | A |   | 11/1986 | Mutoh et al. |   |
|---|---|---|---|---|---|
| 4,702,836 | A |   | 10/1987 | Mutoh et al. |   |
| 5,130,024 | A | * | 7/1992 | Fujimoto et al. | 210/500.36 |
| 5,352,511 | A | * | 10/1994 | Abayasekara et al. | 428/308.4 |
| 6,107,393 | A | * | 8/2000 | Abusleme et al. | 524/545 |
| 6,559,192 | B2 |   | 5/2003 | Maccone et al. |   |
| 7,468,414 | B2 | * | 12/2008 | Nishida | 525/329.7 |
| 2003/0186162 | A1 | * | 10/2003 | Takahashi et al. | 430/270.1 |
| 2005/0043487 | A1 |   | 2/2005 | Felix et al. |   |

FOREIGN PATENT DOCUMENTS

| EP | 866079 A2 | * | 9/1988 |
|---|---|---|---|
| EP | 0 866 079 A2 |   | 9/1998 |
| EP | 0 866 079 A3 |   | 9/1998 |
| EP | 0 964 010 B1 |   | 12/1999 |
| EP | 1 236 503 A1 |   | 9/2002 |
| EP | 1 239 000 A1 |   | 9/2002 |
| EP | 1707580 A1 | * | 10/2006 |
| WO | 03/068374 A1 |   | 8/2003 |
| WO | WO-2005-090417 A1 | * | 9/2005 |

OTHER PUBLICATIONS

Tshmel et al.; "Investigation of the Molecular Structure of Polymer Surfaces by ATR Spectroscopy"; J. Macromol. Sci-Phys., B21(2), pp. 243-264, 1982.

* cited by examiner

*Primary Examiner*—Peter D. Mulcahy
*Assistant Examiner*—Henry Hu
(74) *Attorney, Agent, or Firm*—Arent Fox LLP

(57) ABSTRACT

Powders or hydrophilic manufactured articles of E/CTFE and/or E/TFE thermoprocessable polymers, or of CTFE copolymers, wherein, on the surface of the powder or the manufactured article, one or more of the following hydrophilic units are present:
—C(COOH)H—CH$_2$—; —C(COOM)H—CH$_2$—;
—C(OCOOH)H—CH$_2$—; —C(OCOOM)H—CH$_2$—;
with M=alkaline ion.

9 Claims, No Drawings

POWDERS OR MANUFACTURED ARTICLES HAVING A SURFACE HYDROPHILICITY

The present invention relates to powders or manufactured articles of chlorotrifluoroethylene (CTFE) or tetrafluoroetilene (TFE) thermoprocessable polymers having a surface hydrophilicity combined with good mechanical, chemical and thermal resistance properties.

More specifically the invention relates to powders or manufactured articles of ethylene/CTFE copolymers (E/CTFE), or of ethylene/tetrafluoroethylene copolymers (E/TFE), and of CTFE (PCTFE) copolymers having a surface hydrophilicity combined with good mechanical, chemical and thermal resistance properties.

The E/CTFE, E/TFE, PCTFE polymers are known and,. due to their good mechanical and chemical resistance, are used for preparing coatings and membranes for the filtration of chemicals or aggressive aqueous solutions, for example caustic. For these applications other fluoropolymers at present cannot be used.

U.S. Pat. Nos. 4,623,670 and 4,702,836 describe membranes based on ethylene/chlorotrifluoroethylene (E/CTFE) copolymers commercially known as Halar®, suitable for the microfiltration (purification) of aqueous solutions containing acids and/or strong bases.

Depending on the specific separation process, the membranes can be in the form of flat sheets or of hollow porous fibers and are generally prepared with known processes, for example the phase inversion process or the phase separation process such as DIPS (diffusion induced phase separation) and TIPS (thermally induced phase separation).

Membranes are required having, besides a high chemical resistance, also good mechanical properties and a high hydrophilicity to have a high permeation to water, in the ultrafiltration and microfiltration field for applications as, for example, desalination, water filtration, gas separation, dialysis, since these processes are pressure driven. These membranes must furthermore have a very high filtering surface per volume unit and are generally formed of thousands of hollow porous fibers held together inside a modulus. A high membrane hydrophilicity overcomes the drawback to have to use high pressures to force the water through said membranes which can damage the membrane.

For this reason, when in the manufacture of said membranes hydrophobic polymers fluoropolymers, as for example ECTFE, ETFE, PCTFE are used, it is necessary to render them hydrophilic. This can be done with wetting agents or by adding to the fluoropolymer hydrophilic fillers, such as hydrophilic silica.

The drawback of the hydrophilic membranes obtained by treatment with wetting agents resides in that the obtained hydrophilicity decreases after a prolonged use. It is indeed well known that after a certain period of time it is necessary to re-treat the membranes, with wetting agents.

Patent application Wo 03/068374 describes E/CTFE membranes for ultrafiltration and microfiltration, formed of hollow porous fibers, prepared by the TIPS method, by using hydrophilic silica, in amounts ranging from 10 to 50%, to confer hydrophilicity to said membranes. However the silica addition brings to a variation of the mechanical properties of the manufactured article (for example membrane), in particular a decrease of the elongation at break.

The preparation of water-based pastes for coatings starting from powders is another application of the E/CTFE, or E/TFE, or PCTFE fluoropolymers.

Wetting agents must be used to disperse hydrophobic fluoropolymers powders in water. The most used wetting agents are alcohols having a low number of carbon atoms, for example isopropanol. The drawback of these dispersions is that they are flammable, even at low alcohol percentages (e.g. ~5 w %).

The need was therefore felt to have available hydrophilic ECTFE, ETFE, and PCTFE polymers showing good mechanical, chemical and thermal resistance properties, in particular substantially maintaining the same mechanical, thermal and chemical properties of the corresponding non hydrophilic ECTFE or ETFE or PCTFE.

It has been surprisingly and unexpectedly found that particular polymers of CTFE with ethylene (E), of tetrafluoroethylene (TFE) with E and CTFE copolymers solve the above technical problem.

An object of the present invention are hydrophilic powders or hydrophilic manufactured articles of E/CTFE and/or E/TFE thermoprocessable polymers, and/or of CTFE thermoprocessable polymers, containing monomeric units deriving from at least one of the following monomers:

acrylic monomers of formula:

$$CH_2=CH-CO-O-R_2 \quad (I)$$

wherein $R_2$ is a linear or branched $C_1$-$C_{20}$ alkyl, or a cycloalkyl, optionally containing heteroatoms and/or chlorine atoms, preferably the heteroatoms are O or N;

vinyl monomers of the carboxylic acid having formula:

$$CH_2=CH-O-CO-R_2 \quad (II)$$

wherein on the surface of the powder or of the manufactured article one or more of the following units are present:
—C(COOH)H—CH$_2$—; —C(COOM)H—CH$_2$—;
—C(OCOOH)H—CH$_2$—; —C(OCOOM)H—CH$_2$—;
with M=alkaline ion.

The presence and the amount of the above units on the surface is determined by infrared (IR) analysis by using the Attenuated Total Reflection technique (ATR) and the sampling surface corresponds to a polymeric later having a thickness of about 1.4 µm.

The presence of said acid or salified groups (hydrophilic units) is no longer detectable at a depth over 60% of the thickness starting from the surface, preferably over 40%, at IR analysis by using the ATR technique.

For example, for E/CTFE/monomers of formula (I) polymers the percentage (by moles) of hydrophilic units on the sampling surface is determined by the following equation:

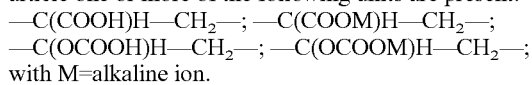

$$\text{Hydrophilic units}=[(R°-Rn)/R°]* \text{ \% molar monomer} \quad (I)$$

wherein
R° is the ratio between the band intensities of the —COOR2 at 1745 cm$^{-1}$ and of —CH$_2$— at 1450 cm$^{-1}$ at the IR by using the ATR technique for the non hydrolyzed polymer sample;
Rn is the R° but for the hydrolyzed sample.

For the other polymers the same ATR technique is used but keeping into account the —COOR$_2$ bands for the monomer of formula (I) or the —OCOR$_2$ bands for the monomer (II) and the characteristic polymer bands, for example —CH$_2$— for ETFE or a characteristic PCTFE band at about 970 cm$^{-1}$.

In practice, the presence of hydrophilic groups at a determined depth is carried out by using a sheet having a thickness of 0.3 mm (300 micron) and 15×25 mm sizes and by carrying out the ATR analysis on the surface before and after the removal of polymeric layers having predetermined thicknesses.

The Applicant has found unexpectedly and surprisingly that the manufactured articles of the invention having on the surface the above hydrophilic groups, that is having a surface hydrophilicity, substantially show the same mechanical properties as the non hydrophilic manufactured articles.

The powder hydrophilicity is shown by the fact that the powders are dispersible in water without using wetting agents, without substantial swelling. To verify that there is no swelling, the size change of the dispersed powder particles is visually evaluated.

The hydrophilicity of the manufactured articles is shown by the lowering of the contact angle with water. (See the, characterization below).

As CTFE thermoprocessable polymers, it can be mentioned:
  CTFE copolymers with 0.01-5% by moles, preferably with 0.05-2% by moles, of at least one of the monomers (I) and (II). These copolymers can be prepared, for example, by following the teaching of EP 964,010;
  polymers formed of ethylene (E), chlorotrifluoroethylene (CTFE) (and/or tetrafluoroethylene (TFE)) and at least an acrylic monomer of formula (I) or (II). These copolymers can be prepared for example by following the teaching of U.S. Pat. No. 6,107,393.

The preferred semicrystalline copolymers of the invention are formed of:
(a) from 10 to 70%, preferably from 35 to 55%, by moles of ethylene;
(b) from 30 to 90%, preferably from 45 to 65%, by moles of a fluorinated monomer selected from tetrafluoroethylene, chlorotrifluoroethylene, or their mixtures;
(c) from 0.1 to 30%, preferably from 1 to 15%, by moles, based on the total amount of monomers (a) and (b), of the acrylic monomer of formula (I):

$CH_2=CH-CO-O-R_2$

Monomer (c) is preferably selected from the comonomers of formula (I) wherein $R_2$ is a linear or branched $C_1$-$C_5$ alkyl, more preferably n-butylacrylate.
  Monomer (b) is preferably CTFE.

The hydrophilic units on the surface of the polymeric layer, measured by the ATR technique, are at least 0.1% by moles, preferably at least 0.5% by moles, more preferably at least 1% by moles, with respect to the total amount of monomers but excluding monomers (I) and (II).

Manufactured articles having very good hydrophilic properties are obtained also at values of 2% of hydrophilic units on the surface (see the Examples). A maximum value of the amount of hydrophilic units does not exist. In practice the maximum value is reached when the swelling does take place in the-presence of water, that is the volume of the manufactured article substantially changes with respect to the starting non hydrophilic manufactured article.

As said, the manufactured articles of the present invention, even though they have hydrophilic groups on the surface, substantially show the same mechanical properties as the manufactured articles formed of the starting non hydrophilic semicrystalline fluoropolymers.

As hydrophilic manufactured articles, polymeric membranes used in the ultrafiltration and microfiltration field, preferably of aqueous solutions, can be mentioned. Said membranes can be prepared according to known methods, for example the diffusion induced phase separation (DIPS process) or the thermally induced phase separation (TIPS process) according to WO 03/068374, or U.S. Pat. No. 6,559, 192. The latter method requires to prepare the membranes starting from fluoropolymers by their plasticization, with plasticizers suitable to obtain a solution, which brings to a membrane through plasticizer extraction. In particular, the process comprises the hot mixing of the above polymers with one or more plasticizers. The temperature at which the solution is prepared ranges from 140°C. to 195° C., preferably from 160° C. to 180° C. The so obtained solution is worked by extrusion, injection or compression molding to obtain the desired shape to the membrane. Then the so obtained membrane is dipped in a solvent to extract the plasticizer. The extraction can take place at room temperature obtaining a complete removal of the plasticizer in a time ranging from some minutes to some hours, depending on the thickness, the type of extractant and stirring. Times of few minutes are generally sufficient to completely extract the plasticizer. The porous membrane is so obtained after said extraction.

The plasticizers used in the process are selected from those known in the prior art having a vapour pressure lower than 5 mm Hg, preferably lower than 2 mm Hg, at the temperature of 160° C.

The plasticizer amount ranges from 10% to 70% by weight based on the weight of the fluoropolymer, preferably from 25% to 65% by weight, more preferably from 35% to 55% by weight, depending on the porosity of the final membrane.

Hydrogenated plasticizers are preferably used. For example citrates, phthalates, trimellitates, adipates can be mentioned. Citrates and trimellitates, in particular acetyltri-n-butylcitrate and trihexyltrimellitate are preferably used.

As extraction solvents are used those wherein the plasticizer results soluble, but which do not cause the fluoropolymer swelling. The most commonly used class of solvents is the one of the aliphatic alcohols, preferably having a short chain, for example from 1 to 6 carbon atoms, more preferably methanol and isopropanol.

The membranes comprising the hydrophilic polymers of the present invention may also contain inorganic substances, preferably hydrophilic or non hydrophilic silica. These substances are generally used in the known amounts used in the prior art for the preparation of membranes.

Among the manufactured articles of the present invention, multilayer (coupled) manufactured articles, for example pipes, can also be mentioned, wherein the layer exposed to water is formed of the hydrophilic manufactured articles of the present invention. The other layers can be formed of hydrogenated or fluorinated polymers.

The hydrophilic powders of the present invention are used for preparing water-based dispersions (pastes) for the coating of various substrata as, for example, glass, metals, ceramic materials, etc.

An advantage of the powders of the present invention is that they can be dispersed in water without using wetting agents, for example alcohols, or surfactants. The latter generally remain as impurities in the obtained coating and therefore altering its characteristics and properties.

Generally the powders have an average particle size distribution ($D_{50}$) lower than 500 micron, more preferably lower than 100 micron.

The hydrophilic products of the invention are obtained by subjecting the powder or the manufactured article to a particular hydrolysis process.

A further object of the invention is a process for superficially hydrolyzing manufactured articles or powders of E/CTFE (and/or E/TFE) thermoprocessable polymers, or CTFE thermoprocessable copolymers, said polymers containing monomeric units deriving from the monomers of formula (I) and (II), comprising:
A) preparation of a mixture comprising water, a strong alkaline base, preferably NaOH, KOH, and an organic polar solvent soluble in water and not solvents of the fluoropolymer (the so called latent solvents), preferably selected from C$_1$-C$_4$ alcohols, DMSO (Dimethylsulfoxide) and THF (tetrahydrofurane), preferably alcohols;

B) dipping of the manufactured article or of the powder in mixture A) for a time generally between 15 minutes and 10 hours, preferably 1 and 6 hours, preferably under stirring, at temperatures generally between 20° and 100° C., preferably between 40° and 85° C., more preferably between 70° C. and 80° C.;

C) washing of the manufactured article or powder with water, optionally acid water, to remove the basicity;

D) removal of the water and the organic solvent from the manufactured article or powder by drying, preferably at a temperature between 20° and 120° C., more preferably between 40° and 80° C.

Mixture A) is obtained, for example, by preparing a basic solution and by adding the solvent to said solution in the desired amounts, maintaining the mixture under stirring. Alternatively the base can be added to the mixture water/solvent previously prepared in the desired ratios.

Preferably mixtures A) are homogeneous (no phase separation) at the temperature at which the hydrolysis is carried out.

Mixture A) is preferably formed of:
1) from 95 to 5% by weight, more preferably from 70 to 30% by weight, of water;
2) from 5 to 95% by weight, more preferably from 30 to 70% by weight, of a polar organic solvent;
3) from 1 to 30% by weight, preferably from 5 to 25% by weight, more preferably from 10 to 20% by weight, with respect to the total amount of 1) and 2) of strong alkaline base.

Preferably, as alcohol, ethanol is used.

Step B) is carried out by dipping the manufactured article in mixture A) under stirring.

The powder preferably represents less than 50% by weight of the powder+mixture A) system in the hydrolysis step.

The process of the present invention is advantageous as it does not bring to any substantial fluoropolymer swelling, thus substantially maintaining unchanged the starting shape. Furthermore the mechanical properties of the manufactured article treated with the process of the present invention do not change in comparison with those of the starting manufactured article.

Some Examples follow for illustrative but not limitative purposes of the present invention.

EXAMPLES

Characterization

Surface Hydrophilic Units

The presence and the amount of the surface hydrophilic units is determined through IR analysis by using the ATR technique (Attenuated Total Reflection) by employing the FT-IR Nicolet Magna 850 instrument including a single reflection diamond crystal (fixed angle 45°). For the technique see A. E. Tshmel V. I. Vettegren, V. M. Zolotarev: J. Macromol. Sci-Phys., B21 (2), page 243 (1982).

The sampling surface corresponds to a polymeric layer having a thickness of about 1.4 µm.

In particular the spectra of the polymer E/CTFE/monomer formula (I) show absorptions characteristic of E-CTFE and of carbonyl due to the acrylic monomer (about 1745 cm$^{-1}$). To evaluate the concentration variations of the functional acrylic groups the R parameter has been used, defined as the ratio between the intensities at 1745 cm$^{-1}$ and at 1450 cm$^{-1}$, wherein the former band is related to the ester carbonyl-COOR$_2$, while the latter to the scissoring vibrations of the ethylene groups present in the polymeric chain and is considered proportional to the analyzed thickness.

The percentage of hydrophilic units has thus been determined with the following equation:

$$\text{Hydrophilic Units} = [(R^\circ - Rn)/R^\circ] * \text{\% molar of the monomer} \quad (I)$$

as defined above.

Static Contact Angle

The static contact angle towards water MilliQ at 20° C. is evaluated by using the G10—Kruss instrument, according to ASTM D 2578-84, D 5725-99.

When the measured contact angle is >85° the sample is hydrophobic, while when the contact angle is <85° the sample is hydrophilic.

Example 1

Hydrolysis of E/CTFE/n-Butylacrylate (n-BuA) by Using a Mixture Water/Ethanol 65/35

15 g of NaOH (RPE Carlo Erba >98%) in drops are dissolved in 85 g of a mixture water/ethanol 65/35 (w/w) obtaining a basic solution with pH higher than 14.

95 g of the basic solution are introduced in a two-neck flask, equipped with magnetic stirring and thermometer for detecting the internal temperature.

Two sheets of E/CTFE/n-Butylacrylate (40/55/5% molar), having 15×25 mm sizes, thickness 0.3 mm and 1.5 mm, are introduced into two different flasks and dipped in the above basic solution.

The solution containing the sheet is heated (in a water bath) until obtaining an internal temperature of about 75°-77° C., under stirring, under reflux for 6-8 hours.

8 hours later, the polymer sheet is extracted from the basic solution not showing any swelling; then it is abundantly washed with water MilliQ (2-2.5 l) and then twice with 200 ml of an acetic acid solution 10$^{-3}$M. The sheet is then dried in a stove at 40° C. for 1 hour to remove the possible ethanol traces.

The sheet having thickness 0.3 mm is then subjected to ATR analysis measuring the percentage of hydrophilic units of 2.25w.

The hydrolyzed sheet having 1.5 mm thickness is subjected to mechanical tests according to ASTM D 1708 (tensile properties at 23° C. and 50% of humidity; rate=5.50 mm/min).

In Table 1 the results of the mechanical tests in comparison with the data related to the same sheet before hydrolysis are reported.

From the comparison of the data of Table 1 it results that the mechanical properties of the hydrolyzed sheet are substantially the same of the non hydrolyzed sheet, and thus the hydrolyzed polymers of the present invention substantially have the same performances of the non hydrolyzed polymers.

TABLE 1

| | Mechanical tests | | | | |
|---|---|---|---|---|---|
| Polymer | Modulus (MPa) | Yield stress (MPa) | Yield strain (%) | Stress at break (MPa) | Strain at break (%) |
| E/CTFE/n-BuA | 1724 | 35.8 | 3.3 | 47.2 | 200 |
| E/CTFE/n-BuA hydrolyzed | 1620 | 32 | 3.4 | 42.4 | 209 |

Example 2

Hydrolysis of E/CTFE/n-BuA by Using a Mixture Water/Ethanol 75/25

The Example 1 was repeated but by using water/ethanol 75/25 and a sheet having 0.3 mm thickness.

The ATR analysis shows a percentage of hydrophilic units equal to 0.75%.

Example 3

The sheet of the Example 1, having a 0.3 mm thickness, was subjected to ATR analysis after removal of 100 micron from the surface, obtaining a percentage of hydrophilic units lower than 0.25%.

This shows that the hydrolysis phenomenon is substantially limited to the product surface.

Example 4

Basic Hydrolysis of E/CTFE/n-BuA by Using a Mixture Water/THF 90/10

6 g of NaOH (RPE Carlo Erba >98%) in drops are dissolved in 94 g of a mixture containing water/THF 90/10 (w/w) obtaining a basic solution with pH=12.

95 g of the basic solution are introduced in a two-neck flask, equipped with magnetic stirring and thermometer for detecting the internal temperature.

One sheet of E/CTFE/n-Bua copolymer (40%/55%/5% molar), having 15×25×0.3 mm sizes, is introduced in the flask and dipped in the above prepared basic solution.

The solution containing the sheet is heated (in a water bath) until obtaining an internal temperature of about 80° C., under stirring, under reflux for 6 hours.

At the end of the reaction the polymer is taken out from the basic solution, abundantely washed first with water MilliQ (2-2.5 l) and then twice with 200 ml of an acetic acid solution (about $10^{-3}$M).

The sheet is then dried in a stove at 40° C. for 2 hours to remove the possible THF traces.

The ATR analysis carried out on the sheet after the hydrolysis reaction has given a percentage of hydrophilic units of 1.75%.

Example 5

Basic Hydrolysis of E/CTFE/n-BuA by Using a Mixture Water/DMSO 65/35

14 g of NaOH (RPE Carlo Erba >98%) in drops are dissolved in 86 g of a mixture containing water/DMSO 65/35 (w/w) obtaining a basic solution with pH=14.

95 g of the basic solution are introduced in a two-neck flask used in the Example 1, by working with the same method and by using the same kind of sheet having 0.3 mm thickness.

The ATR analysis carried out on the sheet after the hydrolysis reaction has given a percentage of hydrophilic units equal to 0.7%.

Example 6

Basic Hydrolysis of E/CTFE/n-BuA in Powder by Using a Mixture Water/Ethanol 65/35

5 g of powder of E/CTFE/n-Butylacrylate (40%/55%/5% molar) having a diameter between 40 and 100 micron and an average diameter $D_{50}$ of 65 micron, are dispersed in 95 g of the basic solution water/ethanol prepared in the Example 1 and introduced in the same equipment described in the Example 1.

The dispersion is heated (in a water bath) at T=80° C. (internal temperature), under stirring under reflux for 1 hour.

At the end of the reaction the powder is washed with water MilliQ until obtaining a pH of the waste water after washing equal to about 7 and filtered on PTFE filter having a pore diameter equal to 1.2 micron. Then the powder is dried in a stove at 40° C. for 2-3 hours.

The so hydrolyzed powder shows a percentage of hydrophilic units equal to 1.3%.

Example 7

The Example 6 is repeated by increasing the reaction time from 1 hour to 4 hours, obtaining on the powder a percentage of hydrophilic units equal to 3.5%.

Example 8 (Comparative)

Three test tubes were prepared, containing:
- 1 g E/CTFE (50%/50% by moles) in powder +10 ml of water MilliQ (TEST TUBE 1);
- 1 g of non hydrophilic E/CTFE/n-BuA in powder of the Example 6 +10 ml of water MilliQ (TEST TUBE 2);
- 1 g of hydrophilic E/CTFE/n-BuA in powder of the Example 6 +10 ml of water MilliQ (TEST TUBE 3).

The three test tubes are stirred for 5 minutes and allowed to stand for further 5 minutes. Then it was noticed the following:
- in the TEST TUBES 1 and 2 the powder floats and does not decant;
- in the TEST TUBE 3 the powder precipitates to the bottom of the test tube.

This shows that the powder of the TEST TUBE 3 is wet by the water and therefore shows hydrophilicity while the powders of the TEST TUBES 1, 2 are not wet by the water and therefore are hydrophobic.

Example 9

40 g of powder obtained as described in the Example 7 are dispersed in 100 g of water MilliQ under mechanical stirring. The obtained dispersion is stable for some minutes.

The dispersion is used to produce a homogeneous film, having thickness between 400 and 600 micron, on a glass sheet having 10×20 cm sizes. After deposition the sheet is put in an oven at 220° C. for 30 minutes to obtain a polymeric film.

This confirms that it is possible to prepare water-based dispersions of hydrophilic E/CTFE for coating (pastes) without using wetting agents, for example alcohols, or surfactants.

Example 10

Three sheets were prepared by compression molding at 265° C. by using the following polymers:
- E/CTFE (50%/50% by moles) (SHEET 1);
- Non hydrophilic E/CTFE/n-BuA (40%/55%/5% by moles) (SHEET 2);
- Hydrophilic E/CTFE/n-BuA of the Example 1 (SHEET 3).

Then the three sheets were subjected to the test of static contact angle obtaining the following contact angles:
SHEET 1: 100°;
SHEET 2: 90°;
SHEET 3: 70°.

This shows that the manufactured article according to the present invent-on (SHEET 3), even though it is formed of a fluorinated polymer, shows surface hydrophilicity.

The invention claimed is:

1. Hydrophilic powders or hydrophilic manufactured articles comprising one or more thermoprocessable copolymers selected from the group consisting of: ethylene/chlorotrifluoroethylene (E/CTFE) polymers, ethylene/tetrafluoroethylene (E/TFE) polymers, and chlorotrifluoroethylene (CTFE) polymers, containing monomeric units deriving from at least one acrylic monomer of formula (I):

  (I)

wherein $R_2$ is a linear or branched $C_1$-$C_{20}$ alkyl, or a cycloalkyl, optionally containing heteroatoms and/or chlorine atoms;

wherein after hydrolysis treatment on the surface of the powder or of the manufactured article, one or more of the following units are present in an amount of at least 0.5% by moles with respect to the total amount of monomers but excluding monomers of formula (I):
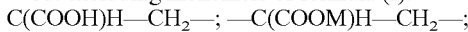
wherein M=alkaline ion, wherein the CTFE copolymers comprise 0.01 to 5% by moles the acrylic monomer of formula (I); and the E/CTFE and E/TFE copolymers comprise 0.1 to 30% by moles of the acrylic monomer of formula (I).

2. The powders or manufactured articles according to claim 1, wherein the polymers are formed of:

(a) from 10 to 70%, by moles of ethylene;

(b) from 30 to 90%, by moles of a fluorinated monomer selected from the group consisting of: tetrafluo-roethylene (TFE), chlorotrifluoroethylene (CTFE), and their mixtures;

(c) from 0.1 to 30%, based on the total molar amount of monomers (a) and (b), of the monomer of formula (I):

  (I), wherein $R_2$ is a linear or branched $C_1$-$C_{20}$ alkyl, or a cycloalkyl, optionally containing heteroatoms and/or chlorine atoms.

3. The powders or manufactured articles according to claim 2, wherein monomer (c) is selected from the comonomers of formula (I), wherein $R_2$ is a linear or branched $C_1$-$C_5$ alkyl.

4. The powders or manufactured articles according to claim 2, wherein monomer (b) is CTFE.

5. The powders or manufactured articles according to claim 1, wherein the manufactured articles are in the form of membranes.

6. The powders or manufactured articles according to claim 1, wherein the manufactured articles are in the form of pipes.

7. The powders or manufactured articles according to claim 1, wherein the manufactured articles are in the form of coupled multilayers.

8. The powders or manufactured articles according to claim 1, wherein the powders have an average particle size distribution ($D_{50}$) lower than 500 micron.

9. The powders or manufactured articles according to claim 1, wherein the units on the surface of the powder or of the manufactured article are present in an amount of at least 1% by moles.

* * * * *